(12) United States Patent
Conley et al.

(10) Patent No.: US 6,631,787 B2
(45) Date of Patent: Oct. 14, 2003

(54) LUBRICATION SYSTEM

(75) Inventors: Paul G. Conley, St. Charles, MO (US); Thomas M. Arens, Florissant, MO (US); Zdravko Paluncic, Ludwigshafen (DE); Andreas Schoenfeld, Rodgau (DE)

(73) Assignee: Lincoln Industrial Corporation, St. Louis, MO (US)

( * ) Notice: Subject to any disclaimer, the term of this patent is extended or adjusted under 35 U.S.C. 154(b) by 7 days.

(21) Appl. No.: 09/730,173

(22) Filed: Dec. 5, 2000

(65) Prior Publication Data

US 2001/0030084 A1 Oct. 18, 2001

Related U.S. Application Data

(60) Provisional application No. 60/173,152, filed on Dec. 27, 1999.

(51) Int. Cl.⁷ .......................... B25D 17/26; F01M 1/00; F16N 13/00
(52) U.S. Cl. ................ 184/6.14; 173/DIG. 3; 417/211; 417/328; 184/26; 184/27.1; 184/6.28; 184/44; 184/6.9; 184/96; 184/108; 184/46
(58) Field of Search .................. 184/26, 6.14, 27.3, 184/27.1–36, 6.28, 6.4, 7.4; 173/DIG. 3, 49, 154, 113, 142; 366/121, 128, 123; 409/135; 417/233, 231, 328, 211

(56) References Cited

U.S. PATENT DOCUMENTS

| | | |
|---|---|---|
| 295,793 A | 3/1884 | Nielsen |
| 494,738 A | 4/1893 | Drucbert et al. |
| 524,112 A | 8/1894 | Knipper et al. |
| 564,503 A | 7/1896 | Butler |
| 791,427 A | 5/1905 | Lacroix et al. |
| 831,899 A | 9/1906 | Slagel |
| 1,831,994 A | * 11/1931 | Braselton et al. |

(List continued on next page.)

FOREIGN PATENT DOCUMENTS

| | | |
|---|---|---|
| EP | 0 120 522 A1 | 3/1984 |
| EP | 0 430 024 B1 | 6/1991 |
| GB | 253683 | 6/1926 |
| GB | 264175 | 6/1927 |
| GB | 447193 | 5/1936 |
| GB | 893100 | 4/1962 |
| GB | 1238842 | 7/1971 |
| GB | 2 157 219 A | 10/1985 |
| JP | 58118364 | 7/1983 |
| NL | 8500784 | 10/1986 |

OTHER PUBLICATIONS

Montabert Leaflet No. 7099–½a, Lubricating Sation E.67645, Oct. 18, 1985.
Montabert Leaflet No. 7103–b, Hydraulic Connection Assy E.67890, Feb. 21, 1986.
Promotional Flyer: Torrington Drawn Cup Roller Clutches, Oct. 1990.
Lincoln St. Louis Leaflet, entitled Hydraulic Operated Oil Pump, Single Stroke, Hydraulic Return, Model 83846, Series "A", Undated, but admitted Prior Art.

*Primary Examiner*—Douglas C. Butler
(74) *Attorney, Agent, or Firm*—Senniger, Powers, Leavitt & Roedel

(57) ABSTRACT

A lubrication system for a vibratory apparatus such as a hydraulic striking device. The system includes a lubricant pump for pumping lubricant to one or more points of lubrication on the device and a drive for the pump powered in response to vibration of the device. The system includes a base for attachment to the device for vibration therewith, and a lubricant pump for pumping lubricant from a supply. The pump includes a cylinder and a plunger reciprocable in the cylinder through a stroke between a retracted position for intake of lubricant into the cylinder and a forward position for delivery of the intake from the cylinder. A weight is mounted on the base for oscillation in response to the vibration of the device, oscillation of the weight effecting reciprocation of the plunger through a stroke.

7 Claims, 10 Drawing Sheets

U.S. PATENT DOCUMENTS

| | | | |
|---|---|---|---|
| 1,912,240 A | | 5/1933 | Zerk |
| 1,945,845 A | * | 2/1934 | Zerk ........................... 184/69 |
| 2,098,570 A | | 11/1937 | Davis |
| 2,540,391 A | * | 2/1951 | Harrison |
| 2,728,614 A | * | 12/1955 | Rink ........................... 184/69 |
| 2,869,374 A | * | 1/1959 | Morris |
| 3,391,602 A | * | 7/1968 | Brooks et al. |
| 3,448,817 A | | 6/1969 | Morishita et al. |
| 3,608,673 A | | 9/1971 | Cucciati |
| 3,693,757 A | | 9/1972 | Callahan et al. |
| 3,741,344 A | * | 6/1973 | Kohl et al. ................... 184/69 |
| 3,948,354 A | * | 4/1976 | Fosse et al. ............... 184/6.22 |
| 3,977,496 A | | 8/1976 | Black |
| 4,047,595 A | | 9/1977 | Baker, Jr. |
| 4,406,587 A | * | 9/1983 | Perry ......................... 417/211 |
| 4,576,240 A | | 3/1986 | Matsumoto |
| 4,646,854 A | | 3/1987 | Arndt et al. |
| 5,060,761 A | | 10/1991 | Arndt et al. |
| 5,293,959 A | | 3/1994 | Kimberlin |
| 5,707,215 A | * | 1/1998 | Olney et al. ................ 417/233 |

\* cited by examiner

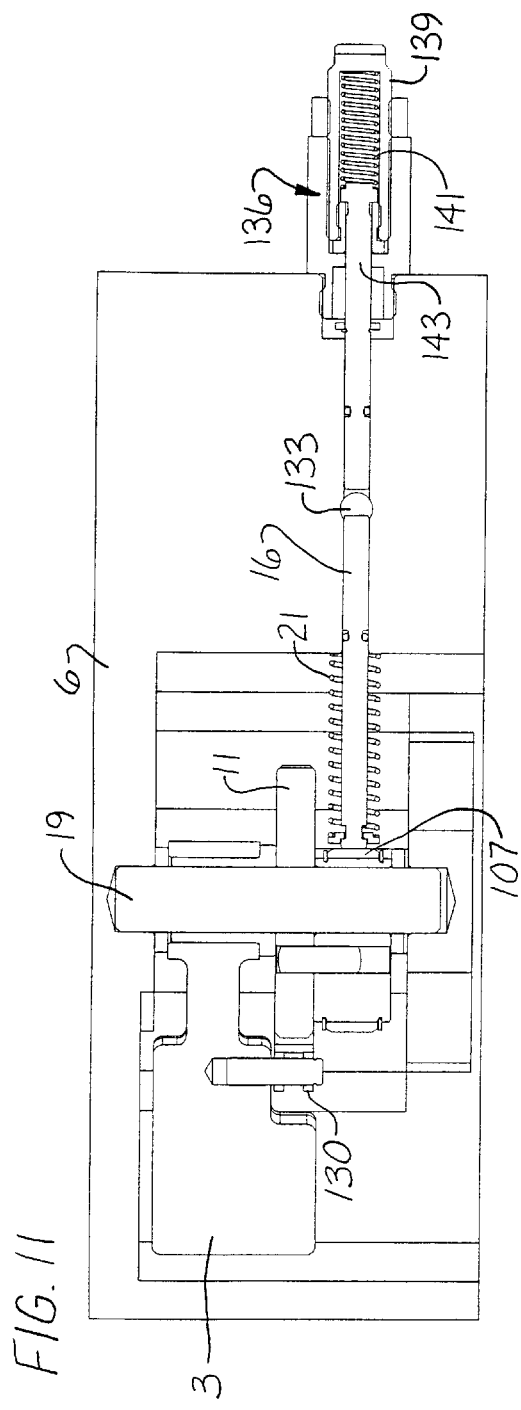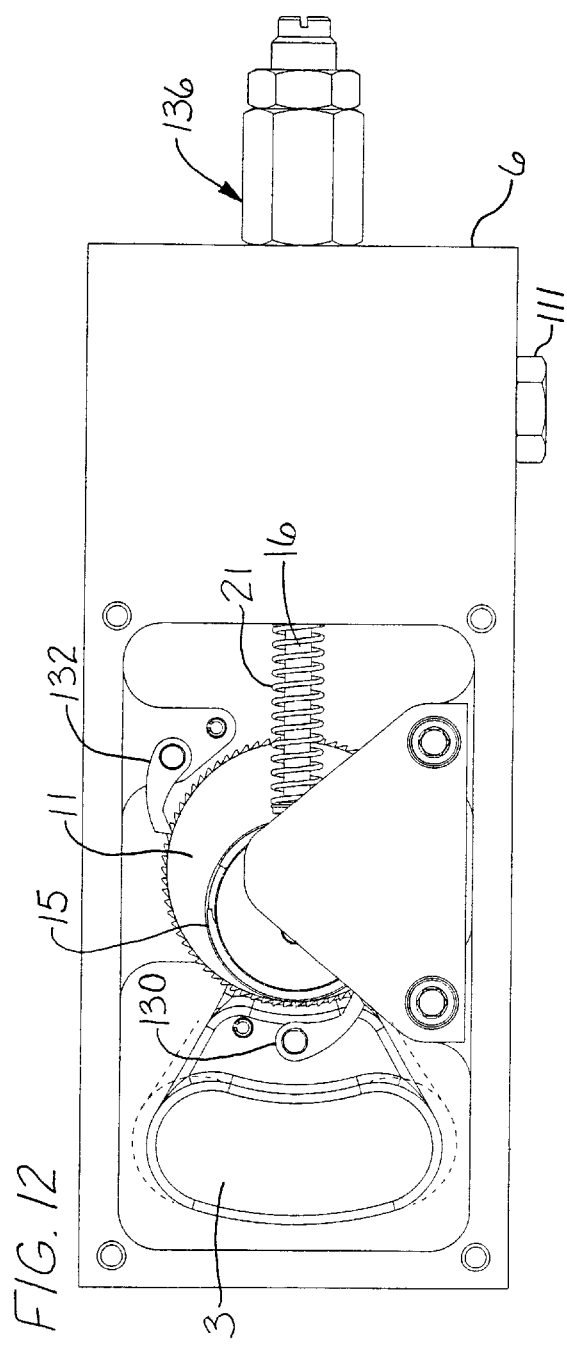

LUBRICATION SYSTEM

CROSS-REFERENCE TO RELATED APPLICATION

This application claims the benefit of provisional application Serial No. 60/173,152, filed Dec. 27, 1999.

BACKGROUND OF THE INVENTION

The invention relates generally to an automatic lubrication system for an impact tool or the like, and more particularly to a system which includes a pump component for delivering lubricant from a lubricant storage container to a location on the tool where the lubricant is to be applied, the lubricant being transported either by its own flow characteristics and/or by means of pressure to the delivery chamber of the pump component, and means for producing a pump stroke of the pump component with each actuation of the impact tool to deliver lubricant to the point of lubrication.

EP-A-0 430 024 describes an automatic lubricating system for the tool of a hydraulic impact mechanism. The system comprises a delivery unit connected to a lubricant storage container for delivering lubricant to the chisel guide supporting the chisel of the impact mechanism. In that case, the lubricant storage container, filled with lubricating grease, features a movable separating component which acts under the bias of a compression spring to force lubricant grease to the delivery chamber of the delivery unit. Here, the delivery pressure of the delivery unit is generated by the same hydraulic operating pressure that drives the impact mechanism, so that each time operating pressure is applied to the impact mechanism, the delivery unit produces a predetermined delivery stroke of adjustable magnitude. Such a lubricating system requires expensive hydraulic and/or pneumatic connecting lines as well as the pertinent control and command installations.

SUMMARY OF THE INVENTION is an object of the present invention to create a simpler and more reliable lubricating system of the type mentioned at the outset.

This task is achieved by an oscillatory mass to which is transferred the impact motion of the tool, and by means which converts the oscillating motion of this mass into a pump pressure for driving the pump component.

In a first embodiment of the invention, the oscillatory mass for actuating the pumping component is either slidably supported on a fixed rod element or is affixed to a movable rod element supported in an axially sliding fashion, so that on each actuation (vibration) of the impact tool the oscillatory mass is deflected from its rest position. In this embodiment, the rod element is preferably aligned with the direction of impact. At least one slide bearing is provided for the oscillating mass. This bearing may consist of a bearing housing in which the mass oscillates back and forth. In the case where the oscillating mass is slidable on a fixed rod element, the slide bearing may comprise the walls of the bearing housing; where the mass is affixed to a movable rod element, the slide bearing for the rod element may comprise the lids of the bearing housing.

To ensure that the oscillating mass returns to its starting point or home position after each oscillation, the mass may be supported on opposite sides by compression springs. The compression springs in turn may react against the end walls or lids of the bearing housing.

A further defining feature of the invention consists of the fact that the rod element comprises, at least in part, a gear rack which is engageable with a gear to drive the pump component. In this embodiment, the gear rack drivingly engages the toothed rim of the gear as the rod element moves through a forward stroke; during a reverse stroke the gear rack slides, ratchet-fashion, over the appropriately inclined teeth of the gear rack. This ensures that the gear that actuates the delivery piston of the pump component moves only in one direction. In this embodiment, the gear rack is preferably attached to one end of the rod element for pivotal movement relative to the axis of rotation of the gear. The rack pivots away from the axis during a reverse stroke of the rod element and is urged by a spring toward the axis during a forward stroke to ensure that the gear rack drivingly engages the gear to drive the pump component.

According to a further aspect of this invention, a cam is used to transfer the motion of the gear to the delivery piston of the pump. The cam has a cam surface which engages the piston to drive it through a forward pumping stroke. A spring is used to move the piston back through a return stroke.

In another aspect of this invention, the range of movement of the oscillating mass, and thus the stroke of the delivery piston, can be varied by an adjustable stop. This stop permits adjustment of the amount of lubricant to be delivered to the lubrication site with each impact.

In another embodiment of this invention, the oscillatory mass is supported on a shaft element by first and second one-way clutches. In this case the axis of the shaft element is preferably oriented crosswise relative to the impact direction of the impact mechanism. Movement of the oscillating mass in one direction causes the first one-way clutch to engage the shaft to rotate it and thus drive the piston of the pump through a forward pumping strike. The second one-way clutch is disengaged from the shaft during this rotation. As the oscillating mass moves in the opposite direction, the first one-way clutch disengages the shaft and the second one-way clutch engages the shaft to prevent reverse rotation of the shaft. In this fashion the impact (vibrating) motion of the tool is converted into a directional rotating movement of the shaft element.

The rotary movement of the shaft is transferred to the piston of the delivery pump by means of a cam having a cam surface which is engageable with the delivery piston of the pump component. Rotation of the eccentric drives the piston through a forward stroke to deliver lubricant to the point of lubrication. The piston is moved through a reverse stroke by a return spring.

In this embodiment, an adjustable stop is provided at the bearing housing to vary the stroke of the delivery piston. This enables the amount of lubricant delivered to be adjusted.

In general, a lubrication system for a vibratory apparatus of the present invention comprises a lubricant pump for pumping lubricant from a supply thereof to one or more points of lubrication of the apparatus. A drive for the pump is powered in response to the vibration of the apparatus.

In another aspect, a lubrication system of the present invention is for a hydraulic striking device, the device being vibratory in operation. The system comprises a base for attachment to the device for vibration therewith and a lubricant pump for pumping lubricant from a supply to one or more points of lubrication of the device. The pump comprises a cylinder and a plunger reciprocable in the cylinder through a stroke between a retracted position for intake of lubricant into the cylinder and a forward position for delivery of the intake from the cylinder. A weight is mounted on the base for oscillation in response to the vibration of the device when the base is attached to the device, oscillation of the weight effecting reciprocation of the plunger through a stroke.

Additional objectives, features and application possibilities of the present invention are found in the description of examples of embodiment, below, based on the drawing. In so doing the defining features, described and/or illustrated in figures, constitute, per se or in any desired combination, the object of this invention, independently of their summarization into individual claims or their back-references.

BRIEF DESCRIPTION OF THE DRAWINGS

FIG. 11 is a plan view of the pump and drive mechanism of FIG. 10, with portions removed to show details; and FIG. 12 is a front elevation of the pump and drive mechanism.

Corresponding parts are designated by corresponding reference numbers throughout the drawings.

DETAILED DESCRIPTION OF PREFERRED EMBODIMENTS

Figure 1:
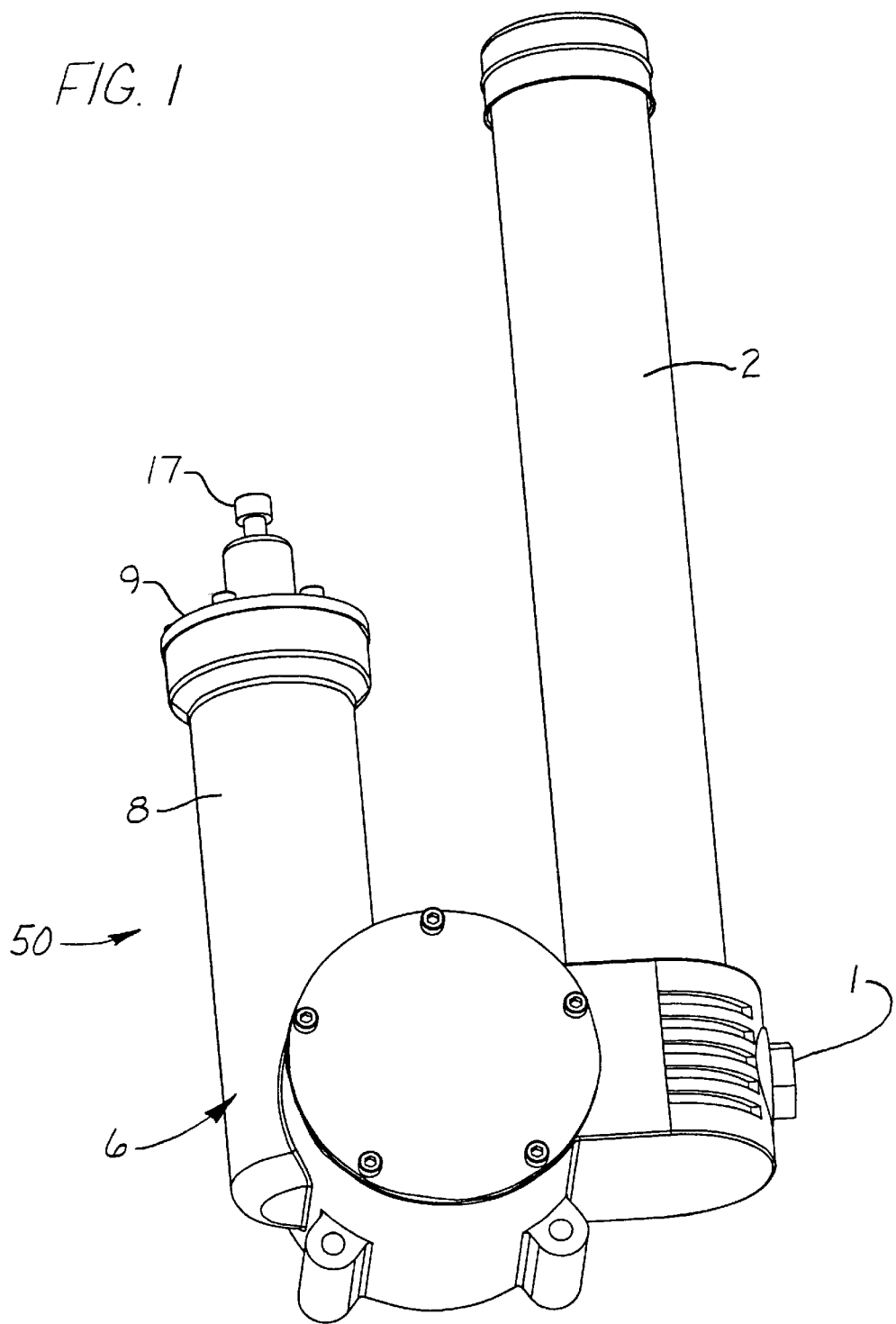
FIG. 1 is a perspective view of a first embodiment of an automatic lubricating system of the present invention.
Figure 2:
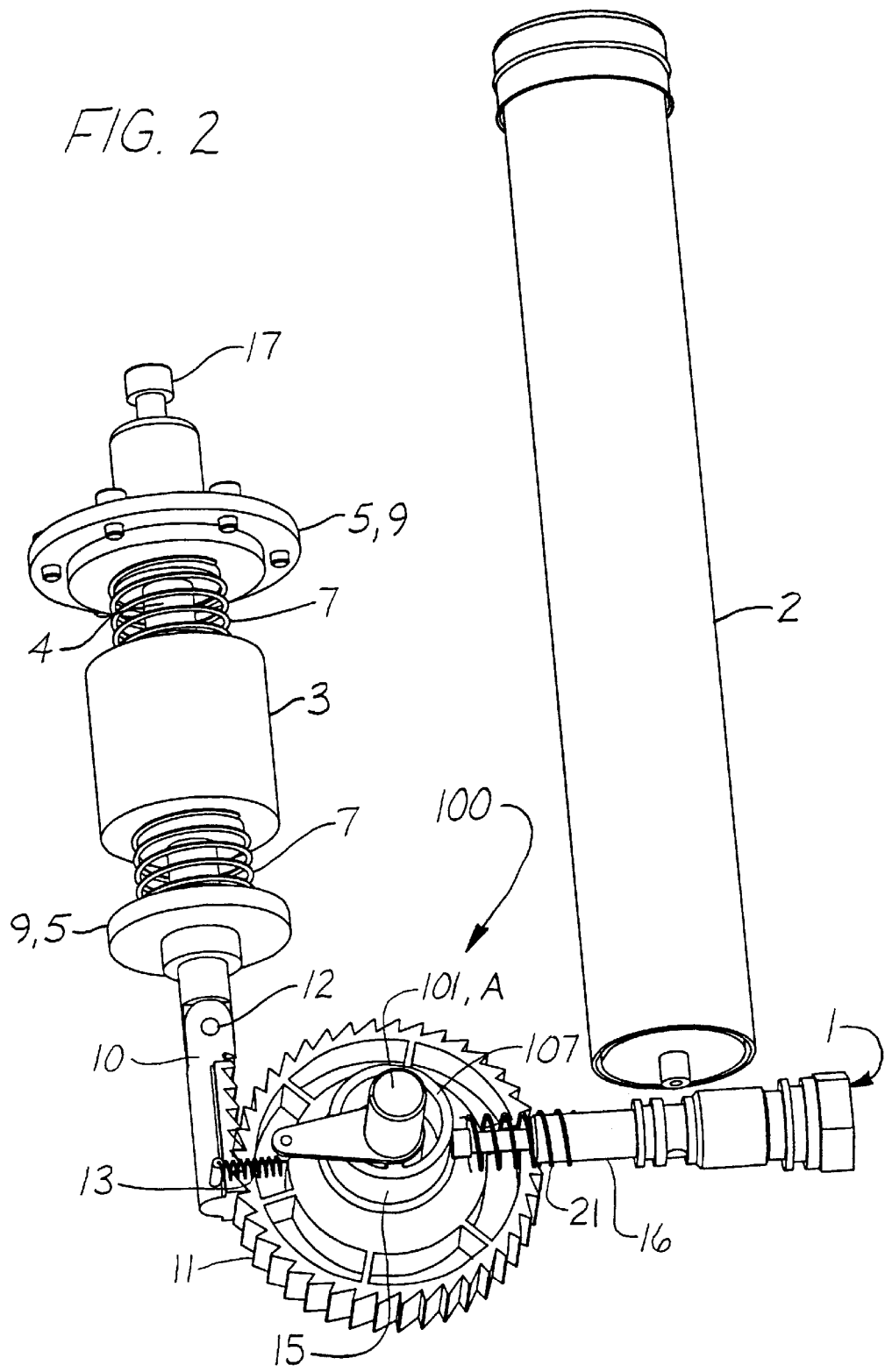
FIG. 2 is a schematic view of a drive mechanism for the delivery piston of a pump component of the system of FIG. 1.
Figure 3:
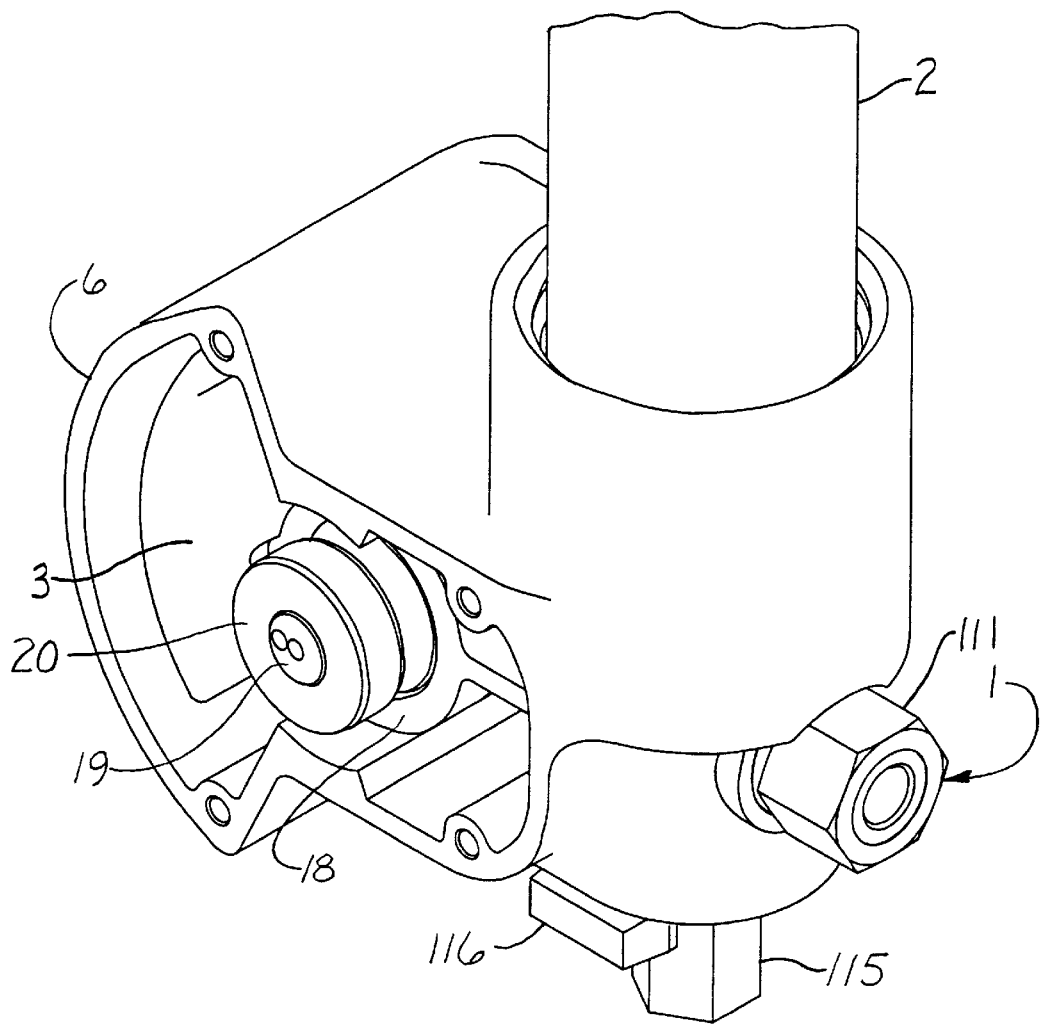
FIG. 3 is a perspective view of a second embodiment of the lubricating system of this invention.
Figure 4:
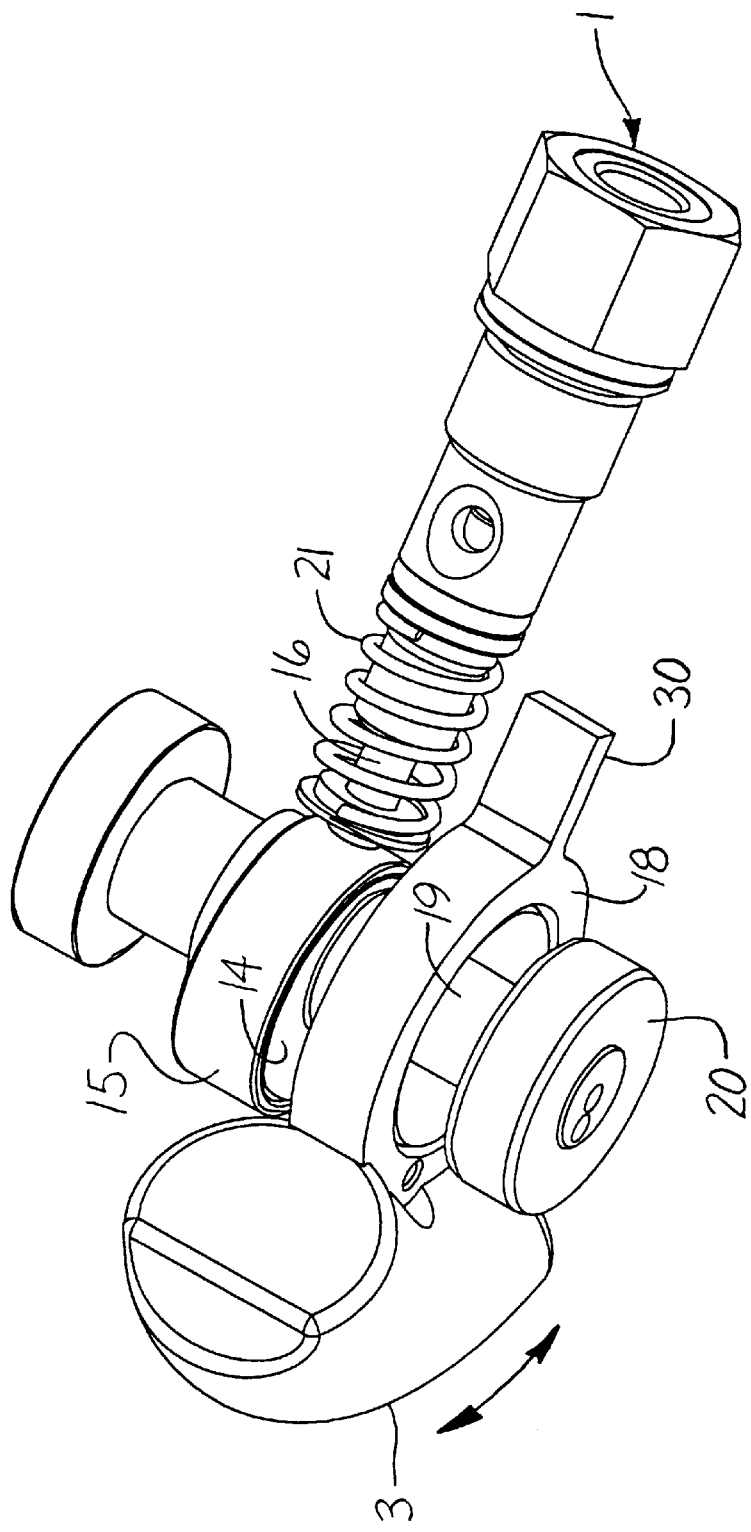
FIG. 4 is schematic view of the essential parts of the mechanism transmitting the motion to the delivery piston of the pump component of the lubricating system of FIG. 3.

Referring now to FIGS. 1 and 2, a lubricating system of a first embodiment of the present invention is generally designated by the reference character 50. When used on an impact tool (e.g., the chisel of a hydraulic hammer), the lubricating system is connected in a manner such that a rod element 4 is aligned with the impact direction of the impact tool.

The lubricating system comprises a pump component 1 for delivering the lubricant from a lubricant storage container 2 (here designed as a replaceable cartridge) to the site of the tool where the lubricant is to be applied. From the lubricant storage container 2, the lubricant is transported to the delivery chamber of the pump component 1, either by gravity as permitted by the lubricant's own flow characteristics and/or by means of pressure exerted by a compression spring acting on a piston movable in the container 2. The purpose of the pump component 1 is to continue the transportation of the lubricant to the lubrication point to be supplied with lubricant. For that purpose, the pump component preferably comprises a delivery piston 16 which can be axially shifted through a pumping stroke against the action of a return spring 13 from the position shown in FIG. 2, so as to displace lubricant from the delivery chamber in the direction of the lubrication point. The compression spring 13 acts on the piston to move it back through a return stroke, as will be described.

In accordance with this invention, drive means generally indicated at 100 is used to drive the pump component 1 (e.g., piston 16) through a pumping stroke in response to vibration of the impact tool. This means 100 includes an oscillatory mass or weight 3 which is arranged and supported on the impact tool in a manner such that the impact motion (vibration) of the tool is transmitted to the mass to cause it to oscillate. The resultant motion of the mass 3 is converted to a motion used to drive the pump component 1.

In the embodiment shown in FIGS. 1–2, the mass 3 is mounted for linear oscillation. Specifically, the mass is an integral part of a rod element 4 that is supported in an axially sliding manner in slide bearings 5 that are formed by the two end walls or lids 9 of a bearing housing 6 having a cylindric wall 8 sized for accommodating the mass 3. The housing 6 functions as a base which is attachable to the impact tool. The mass 3 is urged toward its home position (shown in FIG. 2) by a pair of coil compression springs 7 located on opposite sides of the mass (above and below the mass as shown) and reacting against respective end walls 9 of the housing 6. Upon vibration of the impact tool, the mass 3 will oscillate in the housing 6 to reciprocate the rod element 4 up and down. A stop 17 in the form of a threaded screw is mounted on one of the end walls 9 for engagement with the upper end the rod element 4 to limit the movement or "stroke" of the rod element.

Means 100 for driving the pump component 1 further comprises a gear rack 10 pivoted at 12 (FIG. 2) to the lower end the rod element 4, and a rotary ratchet gear 11 mounted on a shaft 101 for rotation on an axis A. The gear rack 10 (equivalent to a first pawl) pivots toward and away from axis A, but is biased toward axis A by a return spring 13 to bring one or more teeth on the gear rack into engagement with one or more teeth on the ratchet gear 11. The mutually engaging teeth of the gear rack 10 and of the ratchet gear 11 are inclined in a manner such that when the rod element 4 moves downward only upon impact of the tool, the teeth of the gear rack and ratchet gear are urged into engagement by the spring 13 to rotate the ratchet gear in a forward direction. When the rod element 4 moves upward, the inclination of the teeth is such that the gear rack 10 is pushed away from the ratchet gear 11 against the bias of spring 13 to allow the teeth of the gear rack 10 to slide over the teeth of the ratchet gear 11 without retrograde (reverse) rotation of the gear. A pawl (not shown) can be used if needed to hold the ratchet gear 11 against retrograde rotation as the rod element 4 moves up.

An eccentric 107 mounted on shaft 101 rotates with the ratchet gear 11. The eccentric 107 has an outer cam surface 15 which is engageable with the delivery piston 16 of the pump component 1. A return spring 21 pushes the end of the delivery piston 16 against the cam surface 15.

In operation, impact by the impact tool results in vibration which causes the mass 3 to oscillate in the housing 6 and the gear rack 10 to move up and down. As explained above, the reciprocating motion of the gear rack 10 causes the ratchet gear 11 and eccentric 107 to rotate in the forward direction only (retrograde rotation being prevented). Rotation of the cam and cam surface 15 actuates the pump component 1 to deliver lubricant to the impact tool. It will be observed, therefore, that the pump is powered solely in response to vibration of the impact tool and the resultant oscillation of the mass 3. This arrangement has the added benefit that lubricant is delivered to the tool only when the tool is operating and in need of lubrication, and in an amount which is directly proportional to the frequency of impact, i.e., the speed at which the tool is operating, so that more lubricant is provided at higher frequencies.

The pump component 1 is preferably an expansible chamber pump having a movable pump member comprising piston 16 (which may also be referred to as a plunger) slidable in a cylinder, the vibration powered drive means acting to reciprocate the piston in the cylinder. Other pump component arrangements may also be used.

FIGS. 3–8 illustrate a second embodiment of this invention in which parts corresponding to those in the first embodiment are given corresponding reference numbers. In the second embodiment, the mass 3 for actuating the pump component 1 is mounted for swinging oscillation in a compact housing 6 having end walls which are engaged by the weight as it swings back and forth. The mass 3 is attached to a first one-way clutch 18 which supports the weight on a shaft element 19. A second one-way clutch 20 supports the shaft element in the housing for rotation on the axis of the shaft element. In this embodiment, the axis of the shaft element 19 is oriented crosswise to the impact direction of the impact tool. Upon an impact of the impact tool, causing vibration, the swinging mass 3 is rotated on the axis of the shaft element 19. This rotational motion is transferred to the shaft by means of the first one-way clutch 18, thereby causing the shaft to rotate in a forward direction. (The second one way-clutch 20 does not engage the shaft element during this forward motion.) A cam comprising an eccentric 14 is mounted on the shaft element 19. As the shaft rotates, a cam surface 15 on the eccentric 14 acts on the delivery piston 16 of the pump component 1 to move the piston through a forward stoke. A return spring 21 pushes the delivery piston 16 against the cam surface 15. In this fashion the rotary motion of the shaft element 19 is converted to a linear motion of the delivery piston 16, so as to deliver lubricant from the storage container 2 towards the lubrication point of the impact tool that is to be lubricated.

Figure 5:
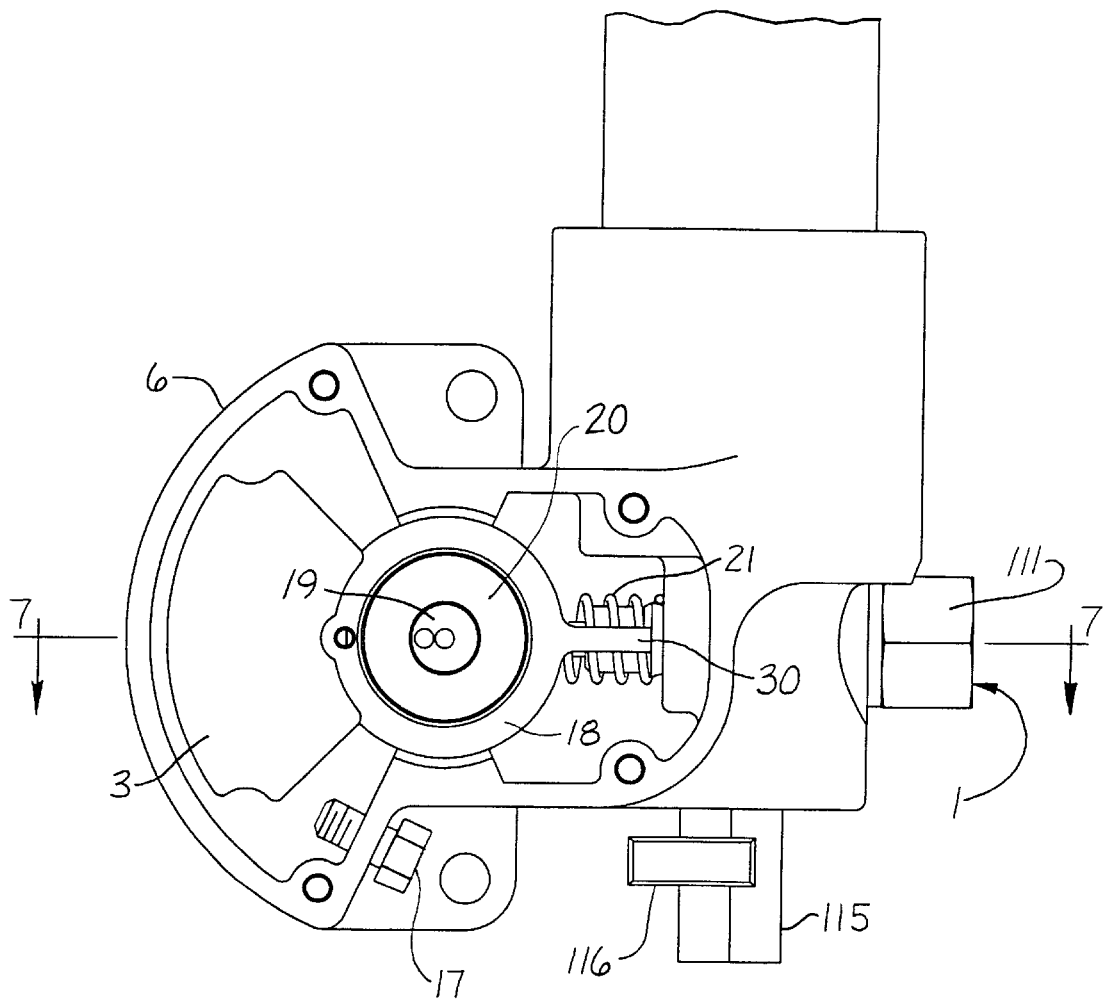
FIG. 5 is an elevational view of FIG. 3.
Figure 6:
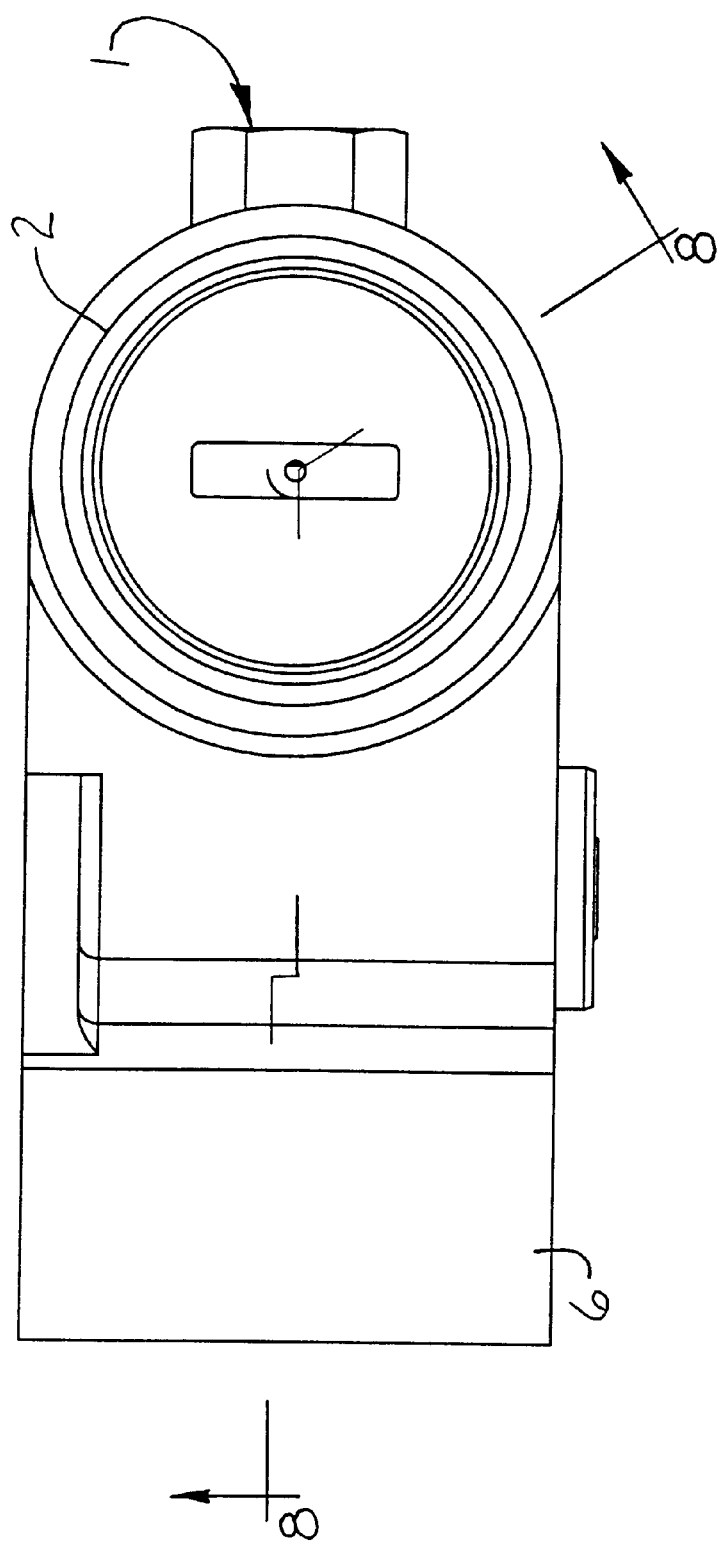
FIG. 6 is a top view of the system of FIG. 3.

When the swinging mass 3 returns to its point of departure, the first one-way clutch 18 disengages the shaft element, and the second one-way clutch 20 engages the shaft to block retrograde rotation of the shaft element. An adjustable stop 17 (e.g., a screw threaded in the housing as shown in FIG. 5) is provided to vary the throw of the mass 3 and thus the stroke of the delivery piston 16 to adjust the amount of lubricant delivered on each forward stroke of the piston. Alternatively, a lever 30 on the first one-way clutch 18, being limited in motion inside the housing 6, functions as a limit stop to limit oscillation of the mass 3.

The one-way clutches 18, 20 may be of any commercially suitable type, such as a drawn cup one-way roller clutch of the type commercially available from The Torrington Company of Torrington, Conn.

Figure 7:
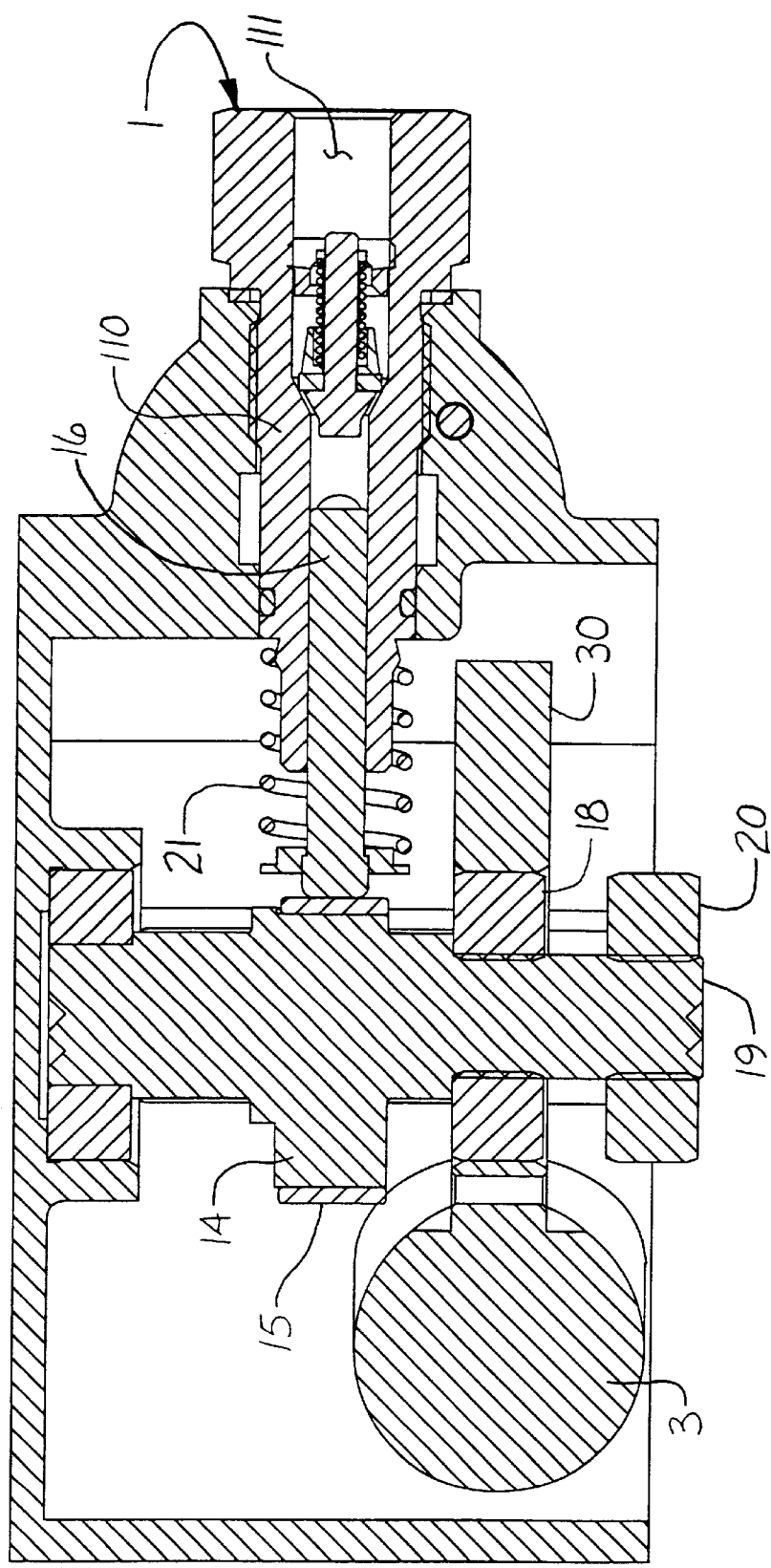
FIG. 7 is a section on line 7—7 of FIG. 5.
Figure 8:
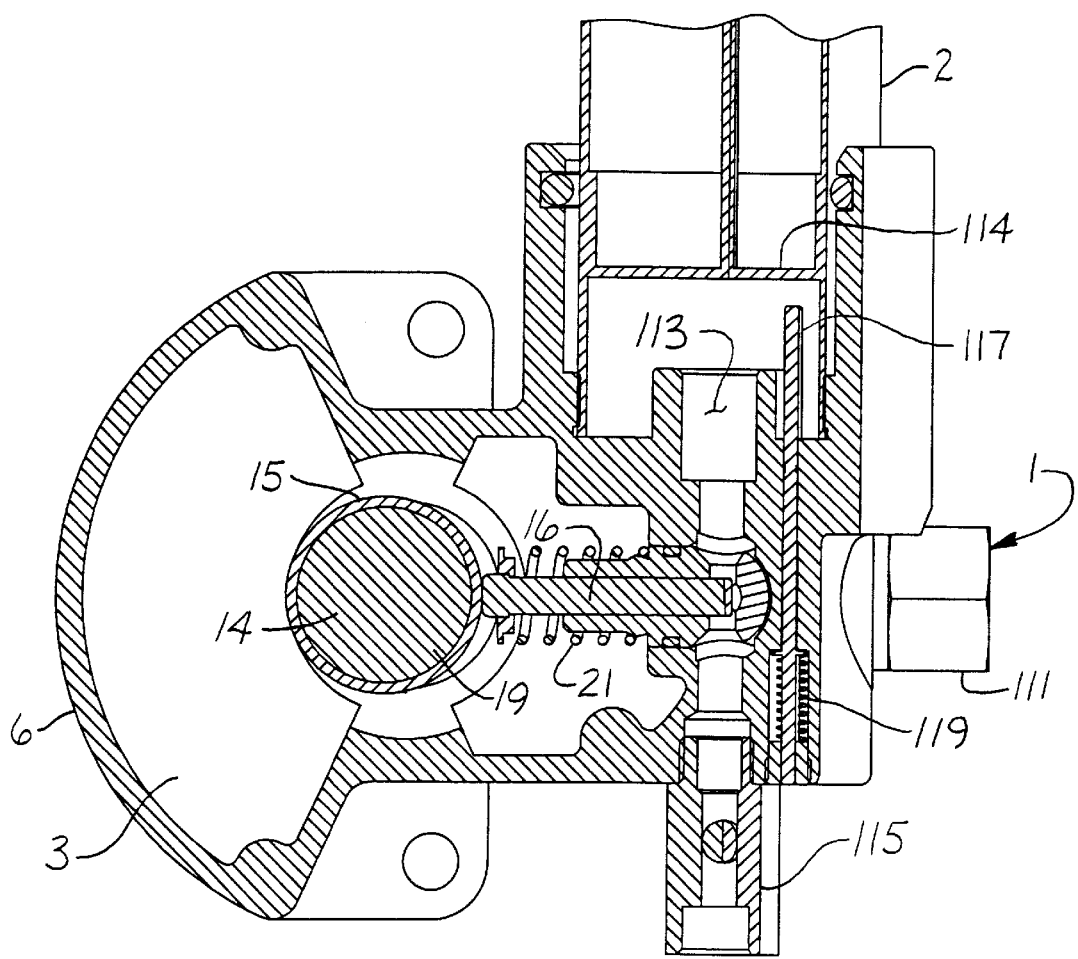
FIG. 8 is a section on line 8—8 of FIG. 6.
Figure 9:
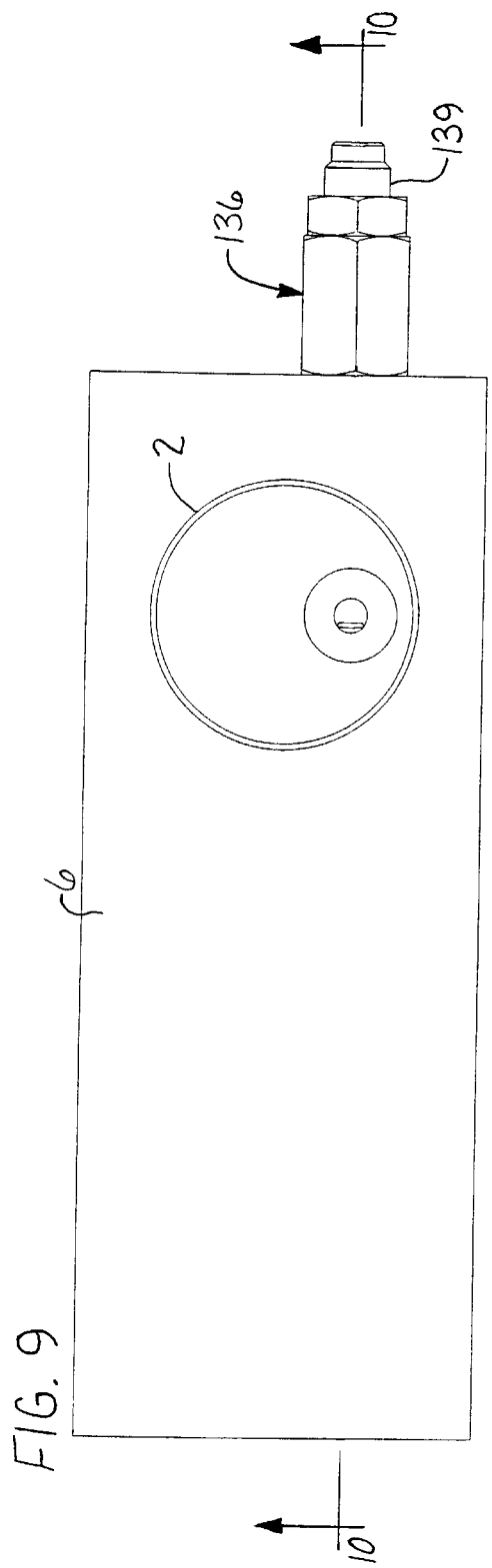
FIG. 9 is a plan view of a third embodiment of a lubrication system of the present invention.
Figure 10:
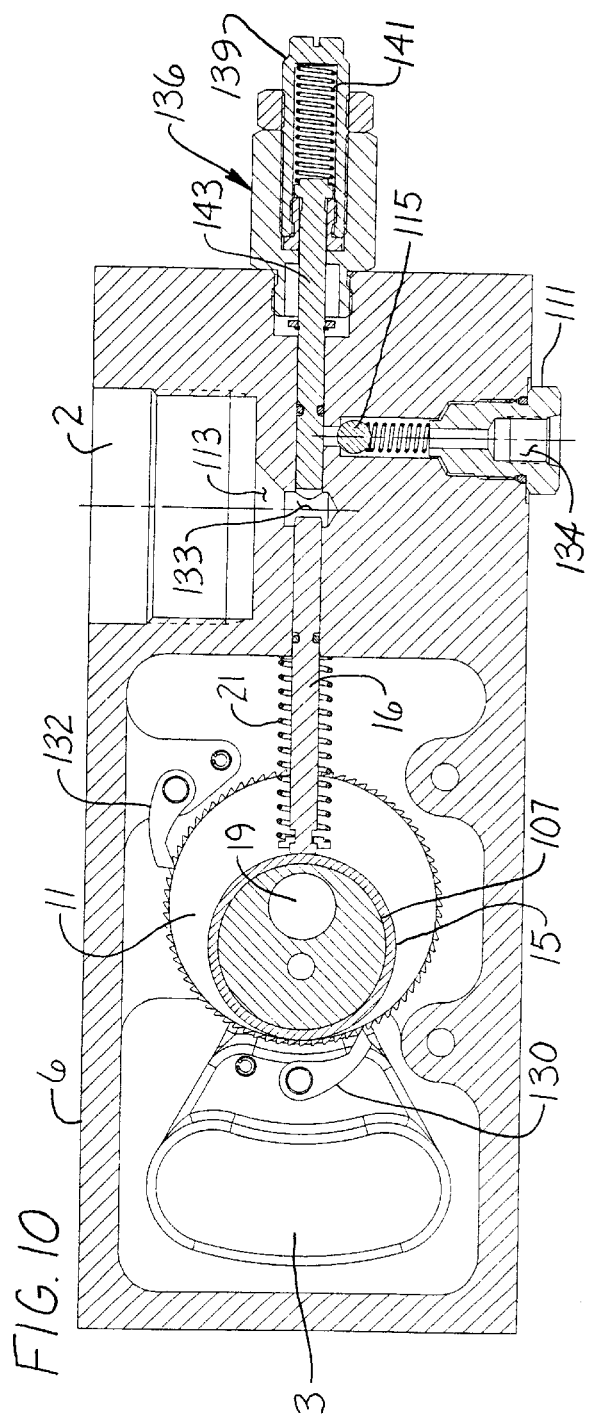
FIG. 10 is a sectional view taken on line 10—10 of FIG. 9 showing the pump and drive mechanism.

In the second embodiment, the pump component 1 is illustrated in FIG. 7 as comprising piston 16 (which may be referred to as a plunger) reciprocable in a cylinder 110 having a central bore with an enlarged outlet end 111. The central bore communicates with the lubricant storage container 2 by means of a flow passage 113 in the housing (see FIG. 8). Lubricant is forced from the container 2 into the cylinder bore by means of the spring-biased piston 114 in the container, and by the vacuum generated by the delivery piston 16 during its return stroke. A vent valve 115 is provided for venting the cylinder. A check valve 116 is mounted immediately upstream of the outlet for blocking back-flow of lubricant into the cylinder.

A low-level indicator pin 117 is provided for visually signaling that the level of lubricant in the storage container 2 is low. The pin 117 is mounted in the housing 6 in a position in which its upper end projects up through the bottom of the storage container 2. When the piston 114 in the container moves down to a level corresponding to a relatively low level of lubricant remaining in the container, the piston will engage the indicator pin 117 and push it downwardly against the bias of a spring 119 until the pin protrudes from the housing to provide a visual indication that the container should soon be replaced or refilled.

FIGS. 9–12 show a third embodiment of the present invention, with parts corresponding to those of the first two embodiments being designated by the same reference numbers. In this embodiment, the mass 3 is pivotally mounted on the shaft 19 so that it oscillates up and down relative to the shaft during operation of the impact tool. A spring-biased pawl 130 mounted on the mass 3 is urged by a spring (not shown) into engagement with a ratchet gear 11 on the shaft to rotate the gear and the shaft incrementally in a forward direction during each downstroke of the mass 3. The pawl 130 slides on the teeth as the mass swings up, with retrograde (reverse) rotation being prevented by a second spring-biased pawl 132 mounted on the housing 6. The drive mechanism of this embodiment also includes an eccentric cam 107 on the shaft 19 having a cam surface 15 which is engageable with a piston 16 for moving the piston in a cylinder bore 133 through a pumping stroke to deliver lubricant to an outlet 111 defined by an outlet bore 134. A return spring 21 moves the piston back through a return stroke and maintains the piston in contact with the cam surface 15. An outlet check valve 115 is mounted in the outlet bore 134, as in the second embodiment. A volume adjustment indicated generally at 136 is provided for adjusting the amount of lubricant delivered to the outlet. This adjustment 136 comprises an adjustment screw 139 which is manually rotatable to compress a spring 141 to apply the desired amount of force to a plunger 143 slidably received in the cylinder bore 133 downstream from the flow passage 113 connecting the cylinder bore 133 and the lubricant container 2. By rotating the adjustment screw 139, the plunger 143 can be moved to a selected position in the cylinder bore to control the amount of lubricant pumped into the outlet bore 134.

In the embodiments described above, the movement of the mass 3 as a result of vibration due to impact of the tool, should generate a torque on the shaft element 19 sufficient to cause the desired pumping pressure. The amount of torque generated can be varied as needed by changing the weight of the mass 3, the radial distance between the center of gravity of the mass and the axis of the shaft element 19, and other variables. The pumping pressure can also be adjusted by using the adjustable stop 17 to vary the range of movement ("throw") of the mass and thus the stroke of the piston.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A lubrication system for vibratory apparatus, said system comprising an expansible chamber pump having a movable pump member for pumping lubricant from a supply thereof to one or more points of lubrication of said apparatus, and a drive for said pump powered in response to the vibration of said apparatus, the drive comprising a weight adapted to oscillate in first and second directions in response to the vibration of said apparatus, a rotatable shaft, a first one-way clutch connected to said weight and adapted to engage the shaft for rotating the shaft upon oscillation of the weight in said first direction and to disengage the shaft upon oscillation of the weight in said second direction, and a second one-way clutch adapted to engage the shaft when the first one-way clutch is disengaged to prevent retrograde rotation of the shaft.

2. A lubrication system as set forth in claim 1 further comprising a cam mounted on the shaft, said movable pump member being engaqeable against a surface of the cam.

3. A lubrication system as set forth in claim 1 further comprising a stop for limiting a stroke of oscillation of the weight.

4. A lubrication system for a hydraulic striking device, said device being vibratory in operation, said system comprising a base for attachment to satd device for vibration therewith, a lubricant pump for pumping lubricant from a supply to one or more points of lubrication of said device, said pump comprising a cylinder and a plunger reciprocable in the cylinder through a stroke between a retracted position for intake of lubricant into the cylinder and a forward position for delivery of the intake from the cylinder, a weight mounted on the base for oscillation in first and second directions in response to the vibration of said device when the base is attached to said device, oscillation of the weight effecting reciprocation of the plunger through a stroke, and a drive powered by oscillation of the weight for reciprocating the plunger, said drive comprising a rotatable shaft, a first one-way clutch connected to said weight and adapted to engage the shaft for rotating the shafi upon oscillation of the weight in said first direction and to disengage the shaft upon oscillation of the weight in said second direction, and a second one-way clutch adapted to engage the shaft when the first one-way clutch is disengaged to prevent retrograde rotation of the shaft.

5. A lubrication system as set forth in claim 4 having lubricant supply mounted on the base.

6. A lubrication system as set forth in claim 4 further comprising a cam mounted on the shaft, said plunger being engageablo against a surface of the cam.

7. A lubrication system as set forth in claim 6 further comprising a stop for limiting a stroke of oscillation of the weight.

* * * * *